United States Patent
Jackson

[11] Patent Number: 6,131,983
[45] Date of Patent: Oct. 17, 2000

[54] TRUCK BED UTILITY TARPAULIN

[76] Inventor: William T. Jackson, 242 Smithfield St., Cannonsburg, Pa. 15317

[21] Appl. No.: 09/376,258

[22] Filed: Aug. 18, 1999

[51] Int. Cl.[7] ................................................. B62D 33/00
[52] U.S. Cl. .......................................... 296/39.2; 296/39.1
[58] Field of Search ................................. 296/39.1, 39.2; 414/786

[56] References Cited

U.S. PATENT DOCUMENTS

| | | | |
|---|---|---|---|
| Re. 33,200 | 4/1990 | Reynolds et al. | 296/39.1 |
| 3,881,768 | 5/1975 | Nix | 296/39 |
| 4,186,845 | 2/1980 | Podd | 296/39 |
| 4,279,439 | 7/1981 | Cantieri | 296/39 |
| 4,333,678 | 6/1982 | Munoz et al. | 296/39 |
| 4,877,281 | 10/1989 | Altman | 296/39.1 |
| 4,960,301 | 10/1990 | Fry et al. | 296/39.2 |
| 5,083,830 | 1/1992 | Mucher et al. | 296/39.2 |
| 5,165,747 | 11/1992 | Stringer et al. | 296/39.2 |
| 5,221,119 | 6/1993 | Emery | 296/39.2 |
| 5,540,473 | 7/1996 | Bills | 296/39.2 |
| 5,722,710 | 3/1998 | Falciani | 296/39.1 |
| 6,059,343 | 5/2000 | Emery | 296/39.2 |

*Primary Examiner*—Joseph D. Pape
*Assistant Examiner*—Kiran Patel
*Attorney, Agent, or Firm*—John D. Gugliotta

[57] ABSTRACT

The present invention is a cloth tarpaulin or liner especially for pick up truck beds. The tarpaulin is formed to the specifications of a truck bed and easily hooks to the back of a truck. The device aids the removal and unloading of bulk materials and hard to remove items such as slag, sand, etc. The tarpaulin ultimately allows a minimal amount of clean up after unloading the truck. The tarpaulin covers the bed of the truck and has pull lines on the front of it so it can be pulled off the bed easily. This can be achieved with another automobile or it can be tied down and moved forward. Any type of material able to withstand heavy use can be suited for this invention.

8 Claims, 4 Drawing Sheets

TRUCK BED UTILITY TARPAULIN

RELATED APPLICATIONS

The present invention was first described in Disclosure Document Number 449194 filed on Dec. 28, 1998. There are no previously filed, nor currently any co-pending applications, anywhere in the world.

BACKGROUND OF THE INVENTION

1. Field of the Invention

The present invention relates generally to tarpaulins for trucks and, more particularly, to an improved tarpaulin for pick up trucks to aid in unloading cargo from the bed of the truck.

2. Description of the Related Art

In the related art, tarpaulins for covering the cargo bed of pick up trucks are well known. There exists a variety of patents for tarpaulins and mechanisms for storing and retracting tarpaulins for both trucks in general and specifically for pick up trucks. However, these tarpaulins are designed only to cover the cargo bed of the truck. With sales at an all-time high, the popularity of the pick-up style truck as an everyday vehicle is more wide spread than it ever has been. Their utility and convenience in hauling items coupled with the availability of luxury interiors and extended cab space have made the pickup a popular alternative to other vehicles. The availability of aftermarket caps that cover the bed enhances the attractiveness of the truck as it serves to create a van-like carrying space, shielded from the outside elements. The pickup, however, suffers from a drawback relating to transporting goods in its bed. For many people, it is difficult to gain access to the bed in order to load and/or unload cargo. One must either reach high over the bed wall or climb up into the bed in order to place or remove items near the cab. As a result, the time spent in loading or unloading is dramatically increased due to dealing with these obstacles. These difficulties are magnified greatly in the situation where the truck is used to transport raw materials such as mulch, dirt, sand or gravel. In unloading the materials, painstaking efforts must be made in order to remove the material from all of the nooks and crannies within the truck bed. Accordingly, the need has arisen for a means by which a pickup truck can be unloaded easily and efficiently, with minimal effort. The development of the Truck Bed Utility Tarp provides this solution.

A search of the prior art did not disclose any patents that read directly on the claims of the instant invention; however, the following references were considered related:

| U.S. Pat. No. | Inventor | Issue Date |
| --- | --- | --- |
| 5,765,901 | Wilkens | June 16, 1998 |
| 5,655,807 | Rosario | August 12, 1997 |
| 5,482,347 | Clarys et al. | January 9, 1996 |
| 4,023,857 | Killion | May 17, 1977 |
| 5,829,819 | Searfross | November 3, 1998 |
| 5,542,733 | Kintz | August 6, 1996 |
| 5,775,765 | Kintz | July 7, 1998 |

SUMMARY OF THE INVENTION

It is therefore an object of the present invention to provide a Truck Bed Utility Tarpaulin.

It is a feature of the present invention to eliminate the need to climb into a pickup truck bed to unload cargo.

It is another feature of the present invention to eliminate navigating over pickup truck bed walls.

It is yet another feature of the present invention to eliminate the need to clean out the bed of the pickup truck after use.

It is yet still another feature of the present invention to increase unloading efficiency.

It is still yet another feature of the present to reduce fatigue.

It is a feature of the present invention to supports large/heavy loads.

It is another feature of the present invention to be sized to maximize pickup truck bed space.

Briefly described according to one embodiment of the present invention, a Truck Bed Utility Tarpaulin is provided comprised of a removable liner that is placed inside a pickup truck bed prior to loading materials such as mulch, dirt, sand or gravel. Constructed of heavy duty canvas or vinyl, the tarpaulin conforms to the shape of the particular truck bed into which it is inserted, covering the floor as well as the walls. The tarpaulin attaches to the pickup bed at the intersection of the bed floor and the tailgate, via a series of metal hooks. A pair of unloading straps, attached to the tarp at the front of the bed, allow the tarp to be pulled in a rolling motion from the front to back, thus unloading the contents of the bed quickly, easily and leaving no residual materials in the truck bed. Once the materials have been transported to the desired location and depending on the size of the load, the contents of the truck bed may require some unloading by hand until a volume is reached wherein the unloading straps can be used. As a result, use of the Truck Bed Utility Tarpaulin allows one to transport and unload a variety of materials with speed and convenience, while minimizing effort and clean-up.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

10 Truck Bed Utility Tarpaulin
15 Main Body
15*a* Bottom Sidewall

15b Right Sidewall
15bb Right Bed Flap
15c Left Sidewall
15cc Left Bed Flap
15d Forward Sidewall
15e Right Wheel Cutout
15f Left Wheel Cutout
20 Unloading Straps
25 Hooks

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
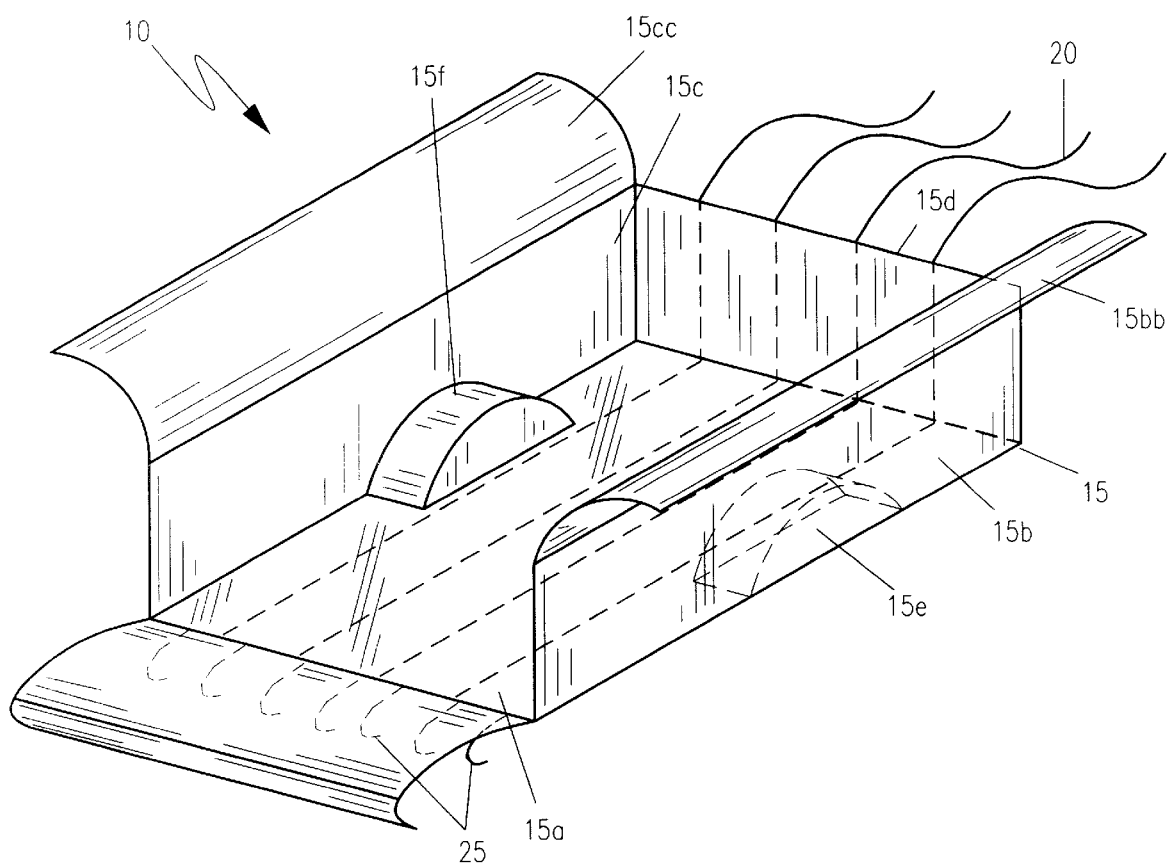
FIG. 1 is a perspective view of a Truck Bed Utility Tarpaulin, according to the preferred embodiment of the present invention.

Referring now to FIG. 1, a perspective view of a Truck Bed Utility Tarpaulin 10 is provided comprised of a one-piece tarpaulin main body 15, a plurality of hooks along the rear edge of said tarpaulin main body 15, and a plurality of unloading straps lining the bottom and front sidewalls of said tarpaulin main body 15. Main body 15 is comprised of a bottomwall 15a, right sidewall 15b, left sidewall 15c, forward sidewall 15d, right bed flap 15bb, left bed flap 15cc, right wheel cutout 15e, and left wheel cutout 15f. Each of the listed components are cut from any sheeted material that is strong and durable such as canvas or vinyl. The components are simply cut to the corresponding specifications of a conventional pick-up truck bed and then stitched together using conventional sewing methods and processes. Pick-up bed wheel cutouts 15e and 15f are provided to ensure an excellent fit. In addition, Right bed flap 15bb and left bed flap 15cc are provided to keep material from falling between the Truck Bed Utility Tarpaulin 10 and the bed of the pickup truck.

Figure 2:
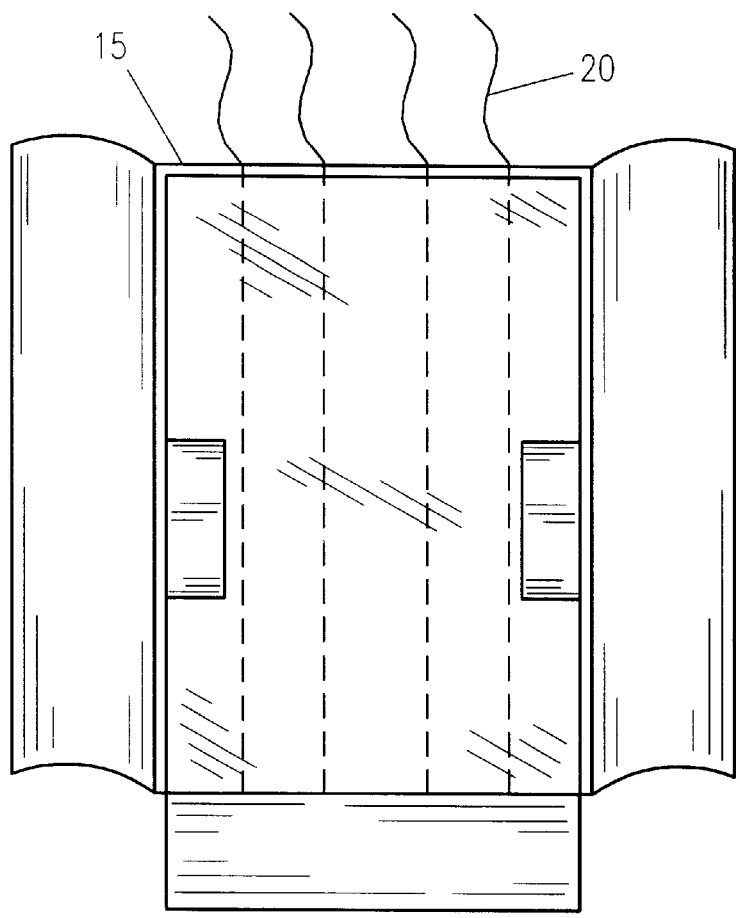
FIG. 2 is a top view of a Truck Bed Utility Tarpaulin, according to the preferred embodiment of the present invention.

Referring now to FIG. 2, a top view of Truck Bed Utility Tarpaulin 10 is shown. A plurality unloading straps 20 line the bottom surface of said bottom sidewall 15a and the front surface of said forward sidewall 15d. These unloading straps 20 run from the rearmost edge of said bottom sidewall to the forward edge of said bottom sidewall, continue along the height of said forward sidewall 15d after making a ninety degree turn, and extend an additional distance to allow one to be able to loop the straps over the bed of the pickup truck to pull the tarpaulin from its front to the rear of the pickup truck bed. The unloading straps 20 are also made from a strong, durable material such as nylon or canvas and stitched along their length to the bottom sidewall 15a and forward sidewall 15d. It is envisioned that at least three unloading straps would be necessary spaced evenly across the width of the main body 15 but this number can be varied according to the user's desire and the varying widths of the beds of different pick up truck models. A plurality of hooks 25 line the rear most edge of said main body for engaging the lip of the pickup truck bed between the pickup truck bed and the tailgate. Hooks 25 are generally of metal construction and are sewn into the rearmost edge of main body 15. The purpose of hooks 25 to hold the rearmost edge of main body 15 in place. This is especially important when unloading straps 20 are being pulled to pull the front of main body 15 to the rear of the pickup truck bed to cause the load inside main body 15 to shift to the rear of the pickup truck bed and ultimately drop off the rear of the truck.

Figure 3:
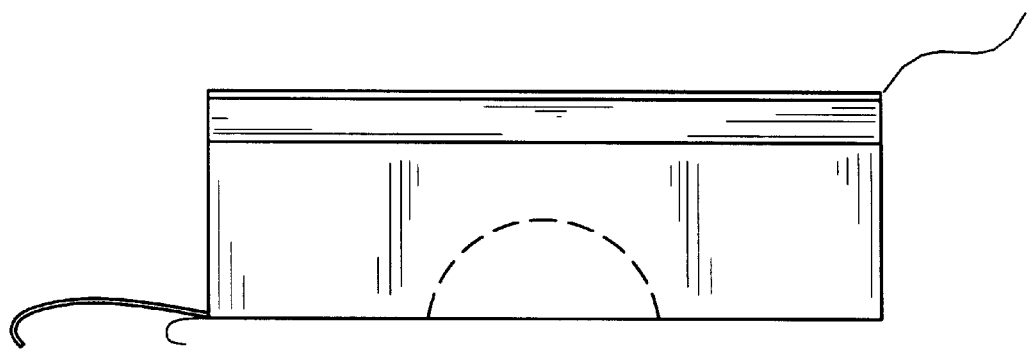
FIG. 3 is side view of a Truck Bed Utility Tarpaulin, according to the preferred embodiment of the present invention.

Referring now to FIG. 3, a side view of Truck Bed Utility tarpaulin 10 is shown. Shown in detail are hooks 25 protruding from the rearmost edge of main body 15 to engage the rear lip of the pickup truck bed. It is envisioned that at least five to six hooks would be necessary to ensure that main body 15 is secured properly but that number may vary according to user's desire and the width of the truck bed according to pickup truck model. Also shown are unloading straps 20 extending from forward sidewall 15d.

Figure 4:
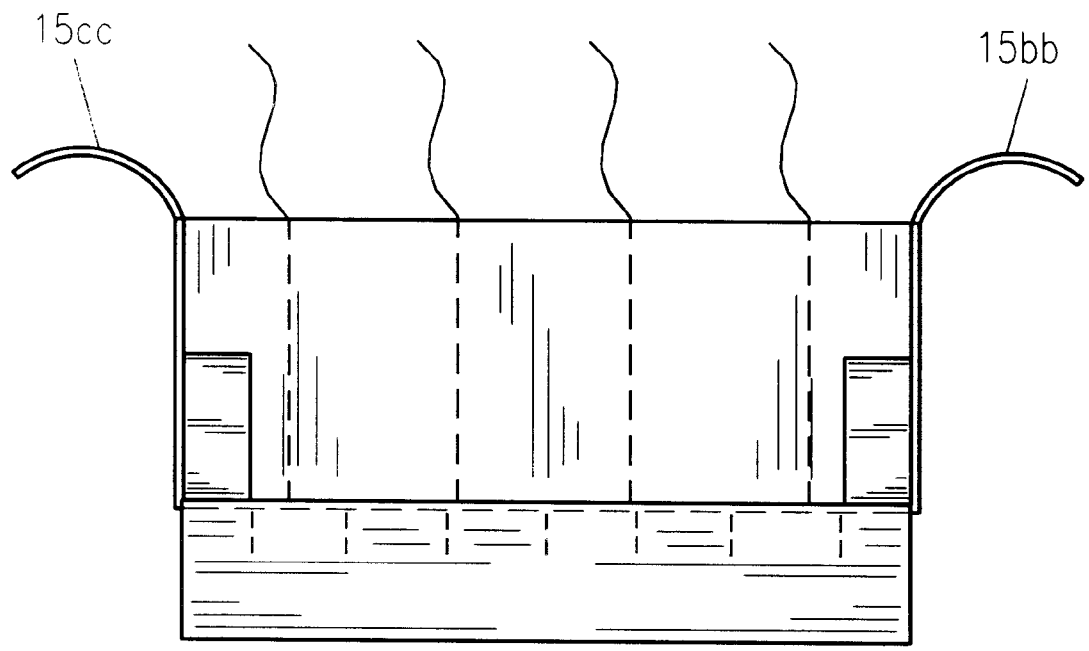
FIG. 4 is a front view of a Truck Bed Utility Tarpaulin, according to the preferred embodiment of the present invention.

Referring now to FIG. 4, a rear view of Truck Bed Utility Tarpaulin 10 is shown. Left bed flap 15cc extends from left sidewall 15c and right bed flap 15bb extends from right sidewall 15b for preventing material from falling between main body 15 and the bed of the pickup truck.

Figure 5:
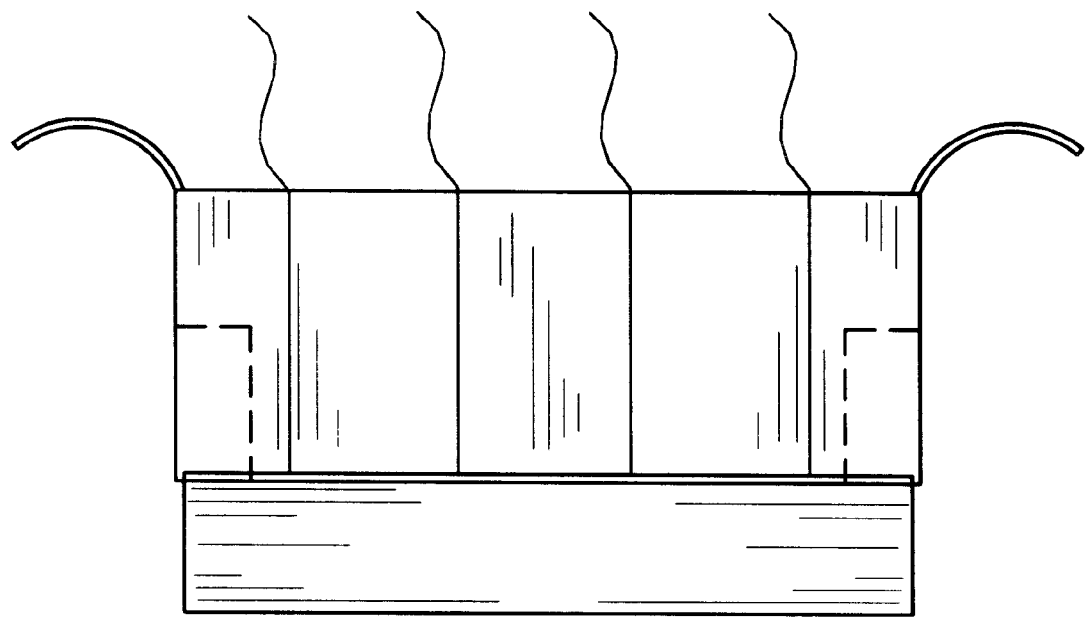
FIG. 5 is a rear view of a Truck Bed Utility Tarpaulin, according to the preferred embodiment of the present invention.
Figure 6:
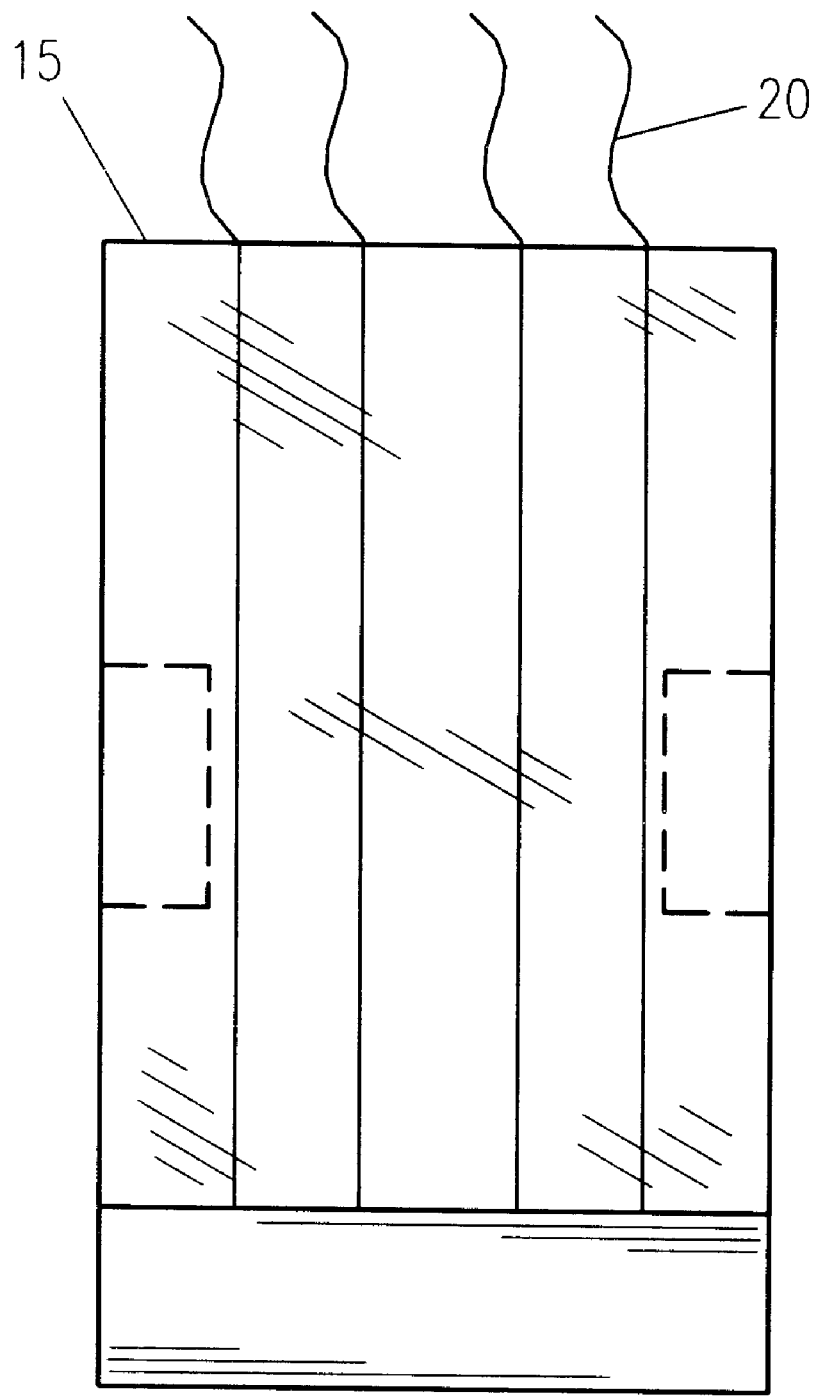
FIG. 6 is a bottom of a Truck Bed Utility Tarpaulin, according to the preferred embodiment of the present invention.

Referring now to FIGS. 5 and 6, shown is a front and bottom view of Truck Bed Utility Tarpaulin 10 showing more detail of the main body 15, unloading straps 20, and hooks 25.

2. Operation of the Preferred Embodiment

To use the present invention, one simply places the tarpaulin in the bed of the truck and inserts the hooks in the space between the bed of the truck and the tailgate. The user then simply ensures that the hooks engage the lip of the truck be between the bed and the tailgate. Next, the right and left bed flaps are folded over the corresponding sides. The unloading straps are then placed out of the way to ensure that they are not buried beneath the load in the truck. Now the truck bed and tarpaulin are filled with the load desired to be moved. Once at the desired delivery site, the truck tailgate is lowered and the load in the bed is free to fall off the back of the truck. The unloading straps can now be pulled by hand or a vehicle to pull the tarpaulin and the load in it towards the back of the truck. Excessively heavy loads may have be partially unloaded by hand to avoid breaking the unloading straps or ripping the tarpaulin.

The foregoing description is included to illustrate the operation of the preferred embodiment and is not meant to limit the scope of the invention. The scope of the invention is to be limited only by the following claims.

What is claimed is:

1. An improved Truck Bed Utility Tarpaulin to aid in unloading cargo from the bed of a conventional pickup truck, comprising:
   a one-piece tarpaulin main body, said tarpaulin main body comprised of a bottom sidewall, right sidewall, right bed flap, left sidewall, left bed flap, forward sidewall, right wheel cutout, and left wheel cutout;
   a plurality of at least three unloading straps, said plurality of unloading straps lining said bottom and front sidewalls of said tarpaulin main body; and
   a plurality of at least five hooks, said plurality of hooks located along a rear edge of said bottom wall of said one piece tarpaulin main body.

2. The Truck Bed Utility Tarpaulin of claim 1, wherein said bottom sidewall, right sidewall, right bed flap, left sidewall, left bed flap, forward sidewall, right wheel cutout, and left wheel cutout are cut from any sheeted material that is strong and durable such as materials from the group consisting of canvas or vinyl.

3. The Truck Bed Utility Tarpaulin of claim 2, wherein said components are cut to the corresponding specifications of a conventional pick-up truck bed and then stitched together using conventional sewing methods and processes.

4. The Truck Bed Utility Tarpaulin of claim 3, wherein said pickup truck bed wheel cutouts are provided to ensure an excellent fit and said right bed flap and said left bed flap are provided to keep material from falling between said Truck Bed Utility Tarpaulin and the bed of said pickup truck.

5. The Truck Bed Utility Tarpaulin of claim 4, wherein said plurality of unloading straps line a bottom surface of said bottom sidewall and a front surface of said forward sidewall and run from a rearmost edge of said bottom sidewall to a forward edge of said bottom sidewall and further, continue along the height of said forward sidewall after making a ninety degree turn, and extend an additional distance to allow one to be able to loop said straps over the bed of said pickup truck to pull said tarpaulin from said forward edge to the rear of said pickup truck bed.

6. The Truck Bed Utility Tarpaulin of claim 5, wherein said plurality of unloading straps are made from a strong, durable material such as materials from the group consisting of nylon or canvas and stitched along their length to said bottom sidewall and said forward sidewall.

7. The Truck Bed Utility Tarpaulin of claim 6, wherein said plurality of hooks line the rear most edge of said main body for engaging a lip of said truck bed between said pickup truck bed and the tailgate of said pickup truck, and wherein said hooks are generally of metal construction and are sewn into a rearmost edge of said main body to hold the rearmost edge of said main body in place.

8. The Truck Bed Utility Tarpaulin of claim 7, wherein said hooks protrude from a rearmost edge of said main body to engage the rear lip of said pickup truck bed.

* * * * *